United States Patent [19]

Trowell et al.

[11] Patent Number: 4,897,429

[45] Date of Patent: Jan. 30, 1990

[54] AROMATIC POLYESTER POLYOLS FROM DIMETHYL TEREPHTHALATE PROCESS RESIDUE AND TALL OIL FATTY ACIDS

[75] Inventors: John M. Trowell, Wilmington, N.C.; Scott F. Lange, Newark, Del.

[73] Assignee: Cape Industries, Wilmington, Del.

[21] Appl. No.: 329,131

[22] Filed: Mar. 27, 1989

[51] Int. Cl.$^4$ .......................... C08G 18/14; B32B 3/26
[52] U.S. Cl. .................................. 521/157; 428/318.4; 428/319.1; 428/423.1; 428/425.1; 428/425.8
[58] Field of Search .............. 428/425.1, 425.8, 318.4, 428/319.1, 423.1; 521/157; 528/74.5, 279, 295.5

[56] References Cited

U.S. PATENT DOCUMENTS 4,758,602 7/1988 Trowell ............................ 428/423.1

*Primary Examiner*—William J. Van Balen
*Attorney, Agent, or Firm*—Gregory N. Clements

[57] ABSTRACT

A polyester polyol composition is prepared by (1) reacting 5 to 40 percent tall oil fatty acids, (b) 20 to 80 percent dimethyl terephthalate process residue and (c) 20 to 60 percent polyhydric alcohol, based on the weight of the reaction mixture, in the presence of an esterification/transesterification catalyst while continuously removing water and methanol that are formed during the reaction, to form a first reaction product containing residual carboxylic acid functionality and (2) reacting 1 to 25 percent of at least one alkylene carbonate, or an equimolar amount of at least one alkylene oxide, with the residual carboxylic acid functionality in the presence of a catalyst. The preferred alkylene carbonate/oxide is ethylene or propylene (or a mixture thereof) carbonate/oxide. A foamed laminate made from the polyester polyol has reduced surface friability and faster rates of cure.

18 Claims, No Drawings

AROMATIC POLYESTER POLYOLS FROM DIMETHYL TEREPHTHALATE PROCESS RESIDUE AND TALL OIL FATTY ACIDS

FIELD OF THE INVENTION

This invention relates to low viscosity, high equivalent weight aromatic polyester polyols that are suitable for use in the manufacture of rigid polyurethane (PUR) and rigid urethane-modified polyisocyanurate (PUR/PIR) foams. This invention especially relates to alkylene carbonate or alkylene oxide modified polyester polyols prepared from dimethyl terephthalate (DMT) process residue and tall oil fatty acids.

BACKGROUND OF THE INVENTION

One problem that is encountered during the use of low viscosity, high equivalent weight polyols to make PUR and PUR/PIR foams is a slow rate of cure, which generally results in surface friability and reduced processing speeds when the foam is used in the manufacture of laminate foam board. Surface friability in turn contributes to reduced adhesion to the facing sheet normally applied to the foam surface during manufacture of the foam board.

Another problem encountered, especially with polyols derived from DMT process residue, is compatibility of the polyol with the trichlorofluoromethane blowing agent commonly used in foam formulations. Low viscosity aromatic polyester polyols with improved blowing agent compatibility are described in U.S. Pat. No. 4,758,602 (Trowell). These polyols are prepared by reacting tall oil fatty acids with an aromatic polyester polyol, e.g., the reaction product of dimethyl terephthalate process residue and diethylene glycol, in the presence of a catalyst. However, the acid number of these polyols is higher than desired for the manufacture of rigid foams, and foaming is too slow.

U.S. patent application Ser. No. 200,982 to Panchak filed June 1, 1988 discloses a mixture of polyester polyol and 5-15 weight percent propylene or ethylene carbonate to reduce the viscosity. No chemical reaction occurs. After the addition of the propylene or ethylene carbonate to the polyester polyol, the modified polyol is ready for use in the production of laminate foam boards.

Polyols that have a low acid number and are readily soluble in chlorofluorocarbon blowing agents and that rapidly produce rigid foams that have good dimensional stability, good flammability characteristics and good compressive properties without the disadvantages of slow cure rate and surface friability would be desirable.

SUMMARY OF THE INVENTION

It has now been found that a low viscosity, high equivalent weight aromatic polyester polyol with improved fluorocarbon solubility and improved foaming properties can be prepared by a process comprising: (1) reacting (a) from about 5 to about 40 percent tall oil fatty acids; (b) from about 20 to about 80 percent dimethyl terephthalate (DMT) process residue; and (c) from about 20 to about 60 percent polyhydric alcohol, based on the weight of the reaction mixture, in the presence of an esterification/transesterification catalyst while continuously removing the water and methanol that are formed during the reaction, to form a first reaction product containing residual carboxylic acid functionality; and (2) reacting from about 1 to about 25 percent of at least one alkylene carbonate, based on the weight of the product of step (1), or an equimolar amount of at least one alkylene oxide, with said residual carboxylic functionality in the presence of a catalyst.

In the broadest sense, the present invention includes not only the above stated process, but a composition of a polyester polyol made from the above stated process, as well as a foamed article made rom the polyester polyol.

DETAILED DESCRIPTION OF THE INVENTION

The first step of the process for preparing the polyester polyols of this invention comprises the rapid esterification/transesterification of a mixture of DMT process residue and tall oil fatty acids with a polyhydric alcohol in the presence of an esterification/transesterification catalyst. A mixture of water and methanol is generated during the reaction and is continuously removed overhead. The reaction is carried out at a temperature of 150° to 235° C., preferably 230° to 235° C., and at atmospheric pressure. The reaction at atmospheric pressure cannot be conducted above about 235° C. because certain polyhydric alcohols boil at such temperature. Operating below 150° C. at atmospheric pressure is commercially not feasible in that the reaction proceeds to slowly or doesn't occur at all. However, it will be apparent to one skilled in the art that pressures higher or lower than atmospheric can be used. At higher pressures the reaction temperature can be increased significantly, thus shortening the reaction time. On the other hand, operating at reduced pressure aids in removal of the water that is formed during the esterification reaction.

From about 20 to about 80 percent by weight of the DMT process residue, preferably from about 30 to about 50 percent, is added in the first reaction step, based on the weight of the reaction mixture. The residue from the manufacture of dimethyl terephthalate is a tar-like, solid material composed of a highly complex mixture of high molecular weight monomeric and polymeric constituents, included among which are the methyl and benzyl esters of biphenyl and triphenyl dicarboxylic and tricarboxylic acids. The residue at 25° C. has the following typical ranges of properties:

| | |
|---|---|
| Color | Dark Brown |
| Drop Softening Point[1] | 10-140° C. |
| Acid Number (ASTM D-1639, neutral chloroform solvent) | 10-110 |
| Methoxyl in COOCH$_3$ (ASTM D-1166-60) | 7-30 percent by weight |
| Dimethyl Terephthalate | 0-20 percent by weight |
| Saponification Number[2] | 375-500 |

[1]Hercules drop softening point method as described on page 12 of a booklet entitled "Wood Rosins, Modified Rosins and Related Resins", published in 1963 by Hercules Powder Company.
[2]Anal. Chem. 23, 1126 (1951).

From about 5 to about 40 percent by weight of tall oil fatty acids, preferably from about 10 to about 30 percent, based on the weight of the reaction mixture, is added in the first reaction step. The term "tall oil" as used in this specification refers to a mixture of rosin acids, fatty acids and other materials obtained by acid treatment of the alkaline liquors from the digesting (pulping) of pine wood. Any tall oil containing from about 60 to about 98 percent fatty acids and from about 0.6 to about 30 percent rosin acids is suitable for use in the process of this invention. The tall oil is added to provide blowing agent compatibility, aid in lowering the viscosity of the final polyol product, and yield a polyol product with a lower hydroxyl number, i.e., a higher equivalent weight.

From about 20 to about 60 percent, preferably from about 30 to about 50 percent, based on the weight of the reaction mixture, of a polyhydric alcohol is added in the first reaction step. The polyhydric alcohol reacts with DMT to produce ester monomer, which is later combined to form polyester. Suitable polyhydric alcohols include aliphatic, cycloaliphatic, aromatic and heterocyclic alcohols, or mixtures thereof, and are preferably diols or triols. Aliphatic dihydric alcohols having 1 to 20 carbon atoms are preferred. Diethylene glycol and polypropylene glycols are especially preferred. The polyols optionally may include substituents that are inert to the esterification/transesterification reaction, for example, chlorine and bromine substituents, and may also be unsaturated. Amino alcohols such as, for example, monoethanolamine, diethanolamine, and triethanolamine can also be used as suitable polyols or polyhydric alcohols.

Any catalyst suitable for esterification or transesterification reactions can be used in the first step of the process of this invention. Such catalysts are well known in the art and include, but are not limited to, tetraisopropyl titanate, zinc oxide and metallic salts of acetic acid of calcium, manganese, zinc and tin. Tetraisopropyl titanate is preferred. The catalyst is used in an amount of 0.01 to about 0.6 percent, preferably from about 0.05 to about 0.15 percent by weight, based on the weight of the first reaction mixture.

The reaction product of the first step, which contains residual carboxylic acid functionality, is held at the reaction temperature and is then partially reacted with an alkylene oxide or carbonate in the presence of a catalyst for the reaction of the alkylene oxide or carbonate with the residual carboxylic acid functionality. Water and perhaps some methanol formed during the reaction are removed to aid in completing the reversible reaction. This reaction substantially reduced any residual acid number and reduced the viscosity of the final product.

The alkylene carbonate added in the second reaction step can be either ethylene or propylene carbonate, or a mixture of these. From about 1 to about 25 percent by weight of the alkylene carbonate, preferably from about 1 to about 10 percent, based on the weight of the product of the first reaction step, is added. If desired, an equimolar amount of ethylene and/or propylene oxide can be substituted for the alkylene carbonate. If an alkylene oxide is used, the reaction temperature and rate of addition of the oxide must be adjusted to avoid excessive pressure and rates of reaction because alkylene oxide is much more reactive. The alkylene oxide or carbonate reduced the acid number of the polyol and reduced foam surface friability so that conventional substrates laminated with the foam will adhere thereto.

Any compound that catalyzes the reaction of the alkylene carbonate with the residual carboxylic acid functionality in the product of the first reaction step can be used as the catalyst in the second reaction step. Suitable catalysts include but are not limited to primary, secondary and tertiary amines. Tripropylamine and benzyltrimethylammonium chloride are preferred. The catalyst is used in an amount of from about 0.1 to about 0.6 percent by weight, based on the weight of the product of the first reaction step.

For use in rigid polyurethane and rigid urethane-modified polyisocyanurate foam formulations, the polyester polyols of this invention have a hydroxyl number of 50 to 800, preferably 100 to 350, an acid number of 0.01 to 20, preferably from 0.01 to 2.0, and a viscosity at 25° C. of 200 to 50,000 cps, preferably from 3,000 to 5,000 cps. Urethane-modified polyisocyanurate foams contain both urethane linkages and isocyanurate rings.

The polyester polyols of this invention are compatible with trichlorofluoromethane, a conventional blowing agent used in the production of closed-cell rigid foams. The polyester polyol is considered to be 100 percent compatible with the blowing agent at a solubility of, for example, about 30 percent by weight of the blowing agent in the polyol. The fluorocarbon compatibility of the polyol product of this invention can be varied from 15 percent to completely miscible by varying the amounts of DMT process residue and tall oil fatty acid used in the preparation of the polyester polyols. A solubility of 30 to 35 percent is preferred.

The polyester polyols prepared by the process of this invention can be used in foam-forming formulations for the manufacture of rigid foams. These formulations exhibit excellent foaming properties, e.g., cream time, gel time, tack-free time, and rise time. The foams have the dimensional stability and compressive strength required for the manufacture of PUR/PIR laminate foam board. The laminated boards are used as building panels and can comprise a single facing sheet having the foam thereon, or a facing sheet on either side of the foam. Any facing sheet material employed to produce building panels can be used. Examples of suitable facing sheet materials include, among others, kraft paper, aluminum, fiber glass and asphalt-impregnated felts, as well as laminates of two or more of these materials.

The following examples are illustrative of this invention and are not intended to limit its scope in any way. All parts and percentages in this specification are by weight unless otherwise noted.

EXAMPLE 1

The following ingredients were charged to a glass five liter, round bottom, four-neck flask equipped with a variable speed agitator, thermal well, nitrogen purge and an overhead system consisting of a 300 mm vacuum jacketed vigreux distillation column and a variable reflux distilling head:

| | | |
|---|---|---|
| Terate ® 101 Aromatic Resin (Hercules Incorporated) | = | 1,476 g |
| Diethylene Glycol | = | 1,404 g |
| Pamak ® 4 Tall Oil Fatty Acid (Hercules Incorporated) | = | 625 g |

TERATE ® 101 aromatic resin is derived from petroleum aromatic hydrocarbons in the production of dimethyl terephthalate. PAMAK ® 4 tall oil fatty acid typically contains 92 percent fatty acids, 4 percent rosin acids and 4.5 percent unsaponifiables.

Heat was applied to the agitator flask with an electrical heating mantle, and a nitrogen purge of 0.2 standard cubic feet per hour (SCFH) was initiated. At a reactor temperature of 110° C., 2.7 grams of tetraisopropyl titanate catalyst was added to the reactor flask. Heating was continued and reaction began at a temperature of 167° C., as indicated by the generation of overheads. The overheads were continuously removed and condensed. At a reactor temperature of 230° C., or approximately 3 hours after initiation of the reaction, the generation of overheads essentially ceased, and the reactor was placed on total reflux. At this time the reactor temperature was 230° C. and 331 g of overheads had been collected. The reactor product had an acid number of 2.1 and a viscosity of 4,500 cps at 25° C. The viscosity was determined using a Brookfield microviscometer. While still under total reflux, 99 g propylene carbonate and 9.6 g TYZOR LA catalyst (DuPont) were added over a 10 minute period using a dropping funnel. TYZOR LA is a lactic acid chelate ammonium salt of titanium. The reactor temperature was maintained at 230° C. and kept under total reflux for 30 minutes after the addition of the propylene carbonate and TYZOR LA. At the end of the 30 minute reflux period, the reactor overheads were taken off of total reflux and overheads were collected for an additional 30 minutes. After collecting 10 additional grams of overheads, heating of the reactor was discontinued and the contents were allowed to cool at 150° C. The analysis of the final product was as follows:

| Viscosity, cps @ 25° C. | = | 4,600 |
|---|---|---|
| Hydroxyl Number | = | 236 |
| Acid Number | = | 1.5 |
| Diethylene Glycol, Percent | = | 10.9 |
| Propylene Carbonate, Percent | = | 1.1 |
| Water, Percent | = | 0.03 |

EXAMPLE 2

The reactor, reactor charge and reaction conditions were the same as those described in Example 1, except that benzyltrimethylammonium chloride was substituted on an equal weight basis for TYZOR LA. The final product analysis was as follows:

| Viscosity, cps @ 25° C. | = | 4,200 |
|---|---|---|
| Hydroxyl Number | = | 248 |
| Acid Number | = | 0.5 |
| Diethylene Glycol, Percent | = | 10.7 |
| Propylene Carbonate, Percent | = | .76 |
| Water, Percent | = | 0.03 |

EXAMPLE 3

The reactor, reactor charge and reaction conditions were the same as those described in Example 1, except that 1,6-hexanediamine was substituted on an equal weight basis for TYZOR LA. Analysis of the final product was as follows:

| Viscosity, cps @ 25° C. | = | 4,400 |
|---|---|---|
| Hydroxyl Number | = | 255 |
| Acid Number | = | 1.1 |
| Diethylene Glycol, Percent | = | 11.4 |
| Propylene Carbonate, Percent | = | 0.91 |
| Water, Percent | = | 0.03 |

EXAMPLE 4

The charge to the reactor was the same as that described in Example 1, except that ARCOL® M-103 propylene glycol blend (Arco Chemical Co.) was substituted on an equal molar basis for diethylene glycol, i.e., 1,872 g; and 168 g propylene carbonate were added.

The reactor and reaction conditions were the same as those described in Example 1, except that the vacuum jacketed vigreux distillation column was replaced with a steam heated Allihn condenser followed with a water cooled Friedrich condenser. The purpose of the steam heated condenser was to eliminate the reflux period after the addition of the propylene carbonate and TYZOR LA. The steam heated condenser acted as a partial reflux condenser, thus allowing light ends, i.e., those by-products boiling at or below 100° C., to be stripped overhead. After the addition of the propylene carbonate and TYZOR LA, the reactor was maintained at 230° C. to 235° C. for an additional 55 minutes. Heating was then discontinued and the reactor contents were allowed to cool to 150° C. Analysis of the final product was as follows:

| Viscosity, cps @ 25° C. | = | 4,000 |
|---|---|---|
| Hydroxyl Number | = | 214 |
| Acid Number | = | 0.4 |
| Diethylene Glycol, Percent | = | 10.6 |
| Tripropylene Glycol, Percent | = | 2.2 |
| Propylene Carbonate, Percent | = | 3.2 |
| Water, Percent | = | 0.07 |

EXAMPLE 5

The charge to the reactor was the same as in Example 1, except that 50 mole percent of the diethylene glycol was replaced with triethanolamine. The reactor and reaction conditions were the same as those described in Example 4 except that the maximum reactor temperature was 180° C. to minimize undesirable side reactions involving the amine. Because of the lower reactor temperature, the reaction time was approximately one hour longer. The analysis of the final product was as follows:

| Viscosity, cps @ 25° C. | = | 21,100 |
|---|---|---|
| Hydroxyl Number | = | 294 |
| Acid Number | = | 2.1 |
| Diethylene Glycol, Percent | = | 7.0 |
| Triethanolamine, Percent | = | 2.5 |
| Propylene Carbonate, Percent | = | 0.19 |
| Water, Percent | = | 0.17 |

EXAMPLE 6

A 145 gallon, jacketed, 25.5 square feet, hot-oil heated, glass-lined reactor agitated with a 3-blade retreat curve impeller (24-inch span, spinning at 115 rpm, 2-HP dive motor), equipped with a one finger baffle, a steam jacketed riser with a 78 square foot stainless steel and tube condenser was charged with the following ingredients:

| Diethylene Glycol | = | 390 pounds |
|---|---|---|
| PAMAK® -4 Tall Oil Fatty Acid (Hercules Incorporated) | = | 181 pounds |

Heat was applied to the reactor and when the contents reach a temperature of 100° C., 410 pounds of Terate® 101 aromatic resin (Hercules Incorporated) were added. When the temperature of the reactor contents approached 110° C., 341 g of tetraisopropyl titanate catalyst are added. Heating the reactor was continued and reaction was initiated at a temperature of 175° to 180° C., as indicated by the collection of condensed overheads. The reactor temperature was increased to a maximum of 235° over the following 4 hours, at which time 97 pounds of condensed overheads had been collected. The reactor was placed on total reflux and 46.5 pounds of propylene carbonate and 1200 g of tripropylamine were added. After 15 minutes under total reflux, the reactor was taken off total reflux and the light ends that had been generated are stripped overhead. After an additional hour, at which time the reactor contents were at 233° C., heating was discontinued and cool-down was initiated. An additional 10 pounds of overheads were collected during the last hour. The analysis of the final, filtered product was:

| Viscosity, cps @ 25° C. | = | 3,500 |
| --- | --- | --- |
| Hydroxyl Number | = | 243 |
| Acid Number | = | 0.2 |
| Diethylene Glycol, Percent | = | 10.9 |
| Propylene Carbonate, Percent | = | 2.2 |
| Water, Percent | = | 0.03 |

EXAMPLE 7

To 100 parts by weight of the product of Example 6 were added 2.5 parts of DC-193 silicone surfactant (Dow Corning Corp.), 0.45 parts of amine catalyst (POLYCAT ® 41, Air Products and Chemicals, Inc.), 2.25 parts of potassium 2-ethyl hexanoate solution (K-15, Air Products and Chemicals, Inc.), and 39.1 parts of Freon ® 11 (DuPont). The mixture was stirred at moderate speed with an electric mixer in a quart paper container to give a uniform solution. To this mixture were added 135.0 parts of methylene diisocyanate (MDI). The resulting mixture was stirred at high speed and then rapidly poured into a 12 inch square box mold and allowed to foam and cure. The molar ratio of isocyanate groups to hydroxyl groups, i.e., the isocyanate index, is calculated to be 2.3. The mix was observed to cream 8 seconds after stirring with MDI was started, and gelled at 27 seconds. The surface became tack-free at 32 seconds, and the foam stopped rising at 63 seconds. The foam was allowed to cure for a day at ambient room conditions before it was cut for testing. Density was measured according to ASTM D-1622 and averaged 1.781 pounds per cubic foot (PCF). Thermal conductivity was measured using an Anacon Model 88 test machine and found to be 0.137 BTU-in/(hr ft$^{2°}$ F.) Humid aging was carried out at 70° C. and 95 to 100 percent relative humidity according to ASTM D-2126. The volume increase at one day was 7.3 percent and at 7 days was 10.5 percent. Samples of this foam were tested using the Mobil 45° Burn Test (Mobil Chemical Company) during which weighed, 2 inch×8.5 inch×0.5 inch samples were held at a 45° angle, ignited with a Bunsen burner near the lower end, and allowed to burn. The sample was reweighed upon cooling and the percent weight loss calculated. The samples of foam average 8.8 percent weight loss.

EXAMPLE 8

This example was identical in all respects to Example 1, except that 168 g ethylene carbonate were used instead of the propylene carbonate and 9.6 g tripropylamine were used instead of the TYZOR LA. The analysis of the final product was as follows:

| Viscosity, cps @ 25° C. | = | 4,400 |
| --- | --- | --- |
| Hydroxyl Number | = | 251 |
| Acid Number | = | 0.2 |
| Diethylene Glycol, Percent | = | 11.1 |
| Ethylene Carbonate, Percent | = | 0.83 |
| Water, Percent | = | 0.05 |

EXAMPLE 9

To 100 parts by weight of the product of Example 8 were added 2.5 parts of DC-193 silicone surfactant (Dow Corning Corp.), 0.45 parts of amine catalyst (POLYCAT ® 41, Air Products and Chemicals, Inc.), 2.25 parts of potassium 2-ethyl hexanoate solution (K-15, Air Products and Chemicals, Inc.), and 39.8 parts of Freon ® 11 (DuPont). The mixture was stirred at moderate speed with an electric mixer in a quart paper container to give a uniform solution. To this mixture were added 139.5 parts of methylene diisocyanate. The resulting mixture was stirred at high speed and then rapidly poured into a 12 inch square box mold and allowed to foam and cure. This mixture was calculated to have an isocyanate index of 2.3. The mixture was observed to cream at 9 seconds and gelled at 26 seconds. The surface became tack-free at 30 seconds, and the foam stops rising at 62 seconds. Curing and testing were then performed as described in Example 7 to give an average density of 1.775 PCF, thermal conductivity of 0.137 BTU-in/(hr ft$^{2°}$ F.), a humid aging volume increase of 5.6 percent at 1 day and 9.90 percent at 7 days, and a Mobil 45° Burn Test result of 12.9 percent weight loss.

EXAMPLE 10

The following ingredients were charged to a glass 5 liter, round bottom, 4-neck flask equipped with a variable speed agitator, thermal well, nitrogen purge and an overhead system consisting of a 300 mm vacuum jacketed vigreux distillation column and Friedrich condenser:

| TERATE ® 101 Aromatic Resin (Hercules Incorporated) | = | 1,476 g |
| --- | --- | --- |
| Diethylene Glycol | = | 1,404 g |
| PAMAK ® 4 Tall Oil Fatty Acid (Hercules Incorporated) | = | 652 g |

Heat was applied to the agitator flask with an electrical heating mantle, and a nitrogen purge of 0.2 SCFH was initiated. At a reactor temperature of 110° C., 2.7 g of tetraisopropyl titanate catalyst was added to the reactor flask. Heating was continued and reaction was initiated at a temperature of 167° C., as indicated by the generation of overheads. The overheads were continuously removed and condensed. At a reactor temperature of 230° C., or approximately 3 hours after initiation of the reaction, the generation of overheads essentially ceased. The total overheads collected are 370 ml or 326.2 g. The reaction product at this time had a viscosity of 4,100 cps at 25° C. The reactor was cooled to 100° C. The cooled reaction product (3,200 g) and 9.6 g tripropylamine were transferred to a one gallon Chemco stirred reactor equipped with a pyrex glass bowl and internal heating and cooling coils. Maximum operating pressure was set at 50 psig. The reactor was purged with nitrogen, after which the unit was sealed.

Heat and agitation were applied and the reactor contents were heated to 100° C. Any pressure increase was vented to the atmosphere. After establishing a temperature of 100° C., 116 ml or 96 g (3.0 weight percent) of propylene oxide were pumped into the reactor below the liquid level using a Miton Roy mini-metering pump at a rate of 15 ml/minute. During the addition of the propylene oxide, the maximum pressure in the reactor was 20 psig, which rapidly decreased to essentially 0 psig after completion of the oxide addition. After 30 minutes, heating of the reactor was discontinued and cooling was initiated. At a temperature of 50° C., a vacuum of 200 mm Hg was applied to the reactor for 15 minutes to remove any unreacted propylene oxide. The analysis of the final product was as follows:

| | | |
|---|---|---|
| Viscosity, cps @ 25° C. | = | 4,600 |
| Hydroxyl Number | = | 272 |
| Acid Number | = | 0.55 |
| Water, Percent | = | 0.05 |
| DEG, Percent | = | 13.6 |

Thus it is apparent that there has been provided, in accordance with the invention, a process for preparing polyester polyol and a foamed laminate made therefrom that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the present invention.

What is claim is:

1. A process for preparing a polyester polyol composition comprising:
    (1) reacting: (a) from about 5 to about 40 percent tall oil fatty acids; (b) from about 20 to about 80 percent dimethyl terephthalate process residue; and (c) from about 20 to about 60 percent polyhydric alcohol, based on the weight of the reaction mixture, in the presence of an esterification/transesterification catalyst while continuously removing the water and methanol that are formed during the reaction, to form a first reaction product containing residual carboxylic acid functionality; and
    (2) reacting from about 1 to about 25 percent of at least one alkylene carbonate, based on the weight of the product of step (1), or an equimolar amount of at least one alkylene oxide, with said residual carboxylic acid functionality in the presence of a catalyst.

2. The process of claim 1, wherein the esterification/transesterification catalyst is tetraisopropyl titanate.

3. The process of claim 1, wherein the catalyst for the second reaction step is tripropylamine or benzyltrimethylammonium chloride.

4. The process of claim 1, wherein step (1) is carried out at a temperature of 150° to 235° C.

5. The process of claim 1, wherein the polyhydric alcohol is diethylene glycol.

6. The process of claim 1, wherein said alkylene carbonate is selected from ethylene carbonate, propylene carbonate, and a mixture of ethylene and propylene carbonate.

7. The process of claim 1, wherein said alkylene oxide is selected from ethylene oxide, propylene oxide, and a mixture of ethylene and propylene oxide.

8. An aromatic polyester polyol composition prepared by a process comprising:
    (1) reacting: (a) from about 5 to about 40 percent tall oil fatty acids; (b) from about 20 to about 80 percent dimethyl terephthalate process residue; and (c) from about 20 to about 80 percent polyhydric alcohol, based on the weight of the reaction mixture, in the presence of an esterification/transesterification catalyst while continuously removing the water and methanol that are formed during the reaction, to form a first reaction product containing residual carboxylic acid functionality; and
    (2) reacting from about 1 to about 25 percent of at least one alkylene carbonate, based on the weight of the product of step (1), or an equimolar amount of at least one alkylene oxide, with said residual carboxylic acid functionality in the presence of a catalyst.

9. The polyol composition of claim 8, wherein the esterification/transesterification catalyst is tetraisopropyl 10. The polyol composition of claim 8, wherein the catalyst for the second reaction step is tripropylamine or benzyltrimethylammonium chloride.

11. The polyol composition of claim 8, wherein the polyhydric alcohol is diethylene glycol.

12. A foamed article of manufacture having reduced surface friability, comprising: a foamed polyurethane or polyisocyanurate core having at least one surface; and one substrate outer layer attached to said surface, wherein said foamed polyurethane or polyisocyanurate core is produced by reacting an isocyanate in the presence of suitable catalysts, surfactants, and blowing agents with a polyester polyol produced by
    (1) reacting: (a) from about 5 to about 40 percent tall oil fatty acids; (b) from about 20 to about 80 percent dimethyl terephthalate process residue; and (c) from about 20 to about 60 percent polyhydric alcohol, based on the weight of the reaction mixture, in the presence of an esterification/transesterification catalyst while continuously removing the water and methanol that are formed during the reaction, to form a first reaction product containing residual carboxylic acid functionality; and
    (2) reacting from about 1 to about 25 percent of at least one alkylene carbonate, based on the weight of the product of step (1), or an equimolar amount of at least one alkylene oxide, with said residual carboxylic acid functionality in the presence of a catalyst.

13. The process of claim 12, wherein the esterification/transesterification catalyst is tetraisopropyl titanate.

14. The process of claim 12, wherein the catalyst for the second reaction step is tripropylamine or benzyltrimethylammonium chloride.

15. The process of claim 12, wherein step (1) is carried out at a temperature of 150° to 235° C.

16. The process of claim 12, wherein the polyhydric alcohol is diethylene glycol.

17. The process of claim 12, wherein said alkylene carbonate is selected from ethylene carbonate, propylene carbonate, and a mixture of ethylene and propylene carbonate.

18. The process of claim 12, wherein said alkylene oxide is selected from ethylene oxide, propylene oxide, and a mixture of ethylene and propylene oxide.

* * * * *